United States Patent
Almay

[19]

[11] Patent Number: 5,809,011

[45] Date of Patent: Sep. 15, 1998

[54] METHOD FOR REROUTING A PACKET-MODE DATA CONNECTION

[75] Inventor: Heikki Almay, Helsinki, Finland

[73] Assignee: Nokia Telecommunications Oy, Espoo, Finland

[21] Appl. No.: 702,489

[22] PCT Filed: Feb. 27, 1995

[86] PCT No.: PCT/FI95/00103

§ 371 Date: Aug. 27, 1996

§ 102(e) Date: Aug. 27, 1996

[87] PCT Pub. No.: WO95/24084

PCT Pub. Date: Sep. 8, 1995

[30] Foreign Application Priority Data

Feb. 28, 1994 [FI] Finland ..................................... 940938

[51] Int. Cl.⁶ ............................. H04L 1/22; H04L 12/56
[52] U.S. Cl. ...................... 370/218; 370/228; 370/395; 340/827
[58] Field of Search ................................. 370/216, 217, 370/218, 221, 223, 224, 225, 227, 228, 229, 235, 395, 399, 241, 242, 248; 340/825.01, 827; 379/221

[56] References Cited

U.S. PATENT DOCUMENTS

| 5,010,550 | 4/1991 | Hirata | 340/825.01 |
| 5,016,243 | 5/1991 | Fite, Jr. | 370/218 |
| 5,235,599 | 8/1993 | Nishimura et al. | 370/228 |
| 5,241,534 | 8/1993 | Omuro et al. | 370/218 |
| 5,268,897 | 12/1993 | Komine et al. | 370/60 |
| 5,319,632 | 6/1994 | Iwasaki | 370/228 |
| 5,398,236 | 3/1995 | Hemmady et al. | 370/218 |

FOREIGN PATENT DOCUMENTS 484943  5/1992  European Pat. Off. .

Primary Examiner—Hassan Kizou
Assistant Examiner—Soon-Dong Hyun
Attorney, Agent, or Firm—IP Group of Pillsbury Madison & Sutro LLP

[57] ABSTRACT

The invention relates to A method for rerouting a connection-oriented packet-mode data connection, especially an ATM network data connection. In the method, traffic to be transferred between two nodes of the network is rerouted from a first, inactivated route to another, new route. To minimize loss of data during rerouting, the node initiating the rerouting sends a notification of the rerouting to the node of the opposite end and simultaneously starts to receive traffic from both routes, the opposite end node, having received the notification concerning the rerouting, starts to receive traffic from both routes, both nodes switch transmission to a new route so that the opposite end receives data from only one route at a time, and that rerouting is terminated for both nodes in that they independently cease to listen to a route to be deactivated.

6 Claims, 2 Drawing Sheets

METHOD FOR REROUTING A PACKET-MODE DATA CONNECTION

This application claims benefit of international application PCT/Fl95/00103 filed Feb. 27, 1995.

BACKGROUND OF THE INVENTION

The invention relates to a method for rerouting a packet-mode data connection.

In principle, the method of the invention may be applied to any connection-oriented packet-switched communications network (e.g. X.25 or Frame Relay), but the invention is primarily intended for an ATM (Asynchronous Transfer Mode) network (allowing high-speed connections) for which it is especially well suited due to its internal characteristics.

ATM is a new connection-oriented packet-switched technique, where the problems of traditional packet networks have been solved by employing short, fixed-size (53-byte) packets, called cells. Each cell consists of a 48-byte payload segment and a 5-byte header. However, the ATM technology is not described here in any greater detail, as the method of the invention does not require any special applications of the ATM technology. A detailed description of the ATM technology is available e.g. in references [1] and [2] (a list of references is at the end of the specification).

In an ATM network (as in other connection-oriented packet networks), connections may be secured by using one or more spare routes between the nodes, in addition to the main route. Thus, when necessary, traffic may be transferred from one route to another. One additional requirement for the ATM network is that the cell order of a connection be maintained. Because the above mentioned cell headers have no sequence numbers allowing their reorganization at the receiving end, the connection must always follow the same route through the network.

However, it is highly probable that transferring traffic from one route to another will cause the cell order to disrupt, resulting in loss of data, at least when the delay of the new route is shorter than that of the old route.

SUMMARY OF THE INVENTION

It is the object of the present invention to eliminate the above disadvantage and to provide a method where a (virtual) connection transmitting packet-mode data is transferred from one route to another with minimum loss of data.

The idea of the invention is to realize the transfer within a certain time window so that, during a period of time, both nodes will receive from both routes, but the transmission in the opposite end functions, however, so that data is received from only one route at a time. The time window is initiated when the node starting the rerouting also starts to listen to a new connection, and the time window is closed when the opposite node ceases to listen to the route to be deactivated. For both nodes, rerouting is terminated in the same way, i.e. when the node independently (using time-out) ceases to listen to the route to be deactivated.

The method of the invention allows the different ends of the connection, typically located far apart, to transfer to a new route at different points of time, since both ends will receive, for a while, traffic pertaining to one particular connection from two different routes. Such non-simultaneity leads to interruptions in systems where transfer from one route to another takes place instantly. Non-simultaneity is difficult to prevent as the request for transfer in a typical network usually passes via several network elements. The response times of these elements are not deterministic (in addition, the requests for transfer are typically processed by software), wherefore it is difficult to determine the exact moment of transfer. Maintenance of an exact real time in the whole network is also difficult.

As described below, the method of the invention also facilitates the control of conflicts caused by the differing interpretations at the different ends of a connection.

BRIEF DESCRIPTION OF THE DRAWINGS

In the following, the invention and its preferred embodiments will be described in greater detail with reference to examples in accordance with the accompanying drawings, in which.

DETAILED DESCRIPTION

The method of the invention is especially applicable to a network transmitting semi-permanent virtual circuits (PVC):

in connection with re-configuration of the network, e.g. when links are deactivated for maintenance, or when returning from a temporary spare connection to the original connection.

Figure 1:
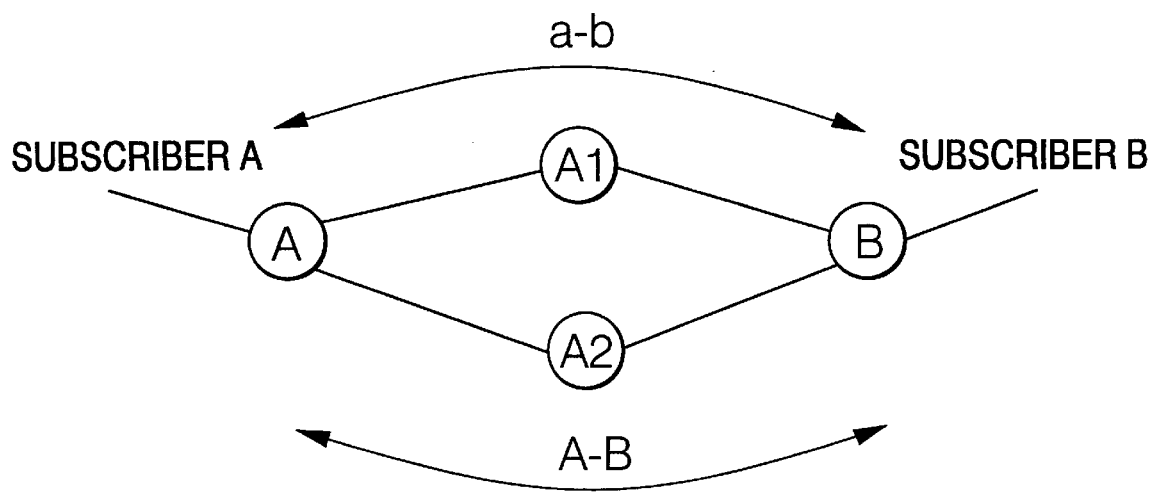
FIG. 1 shows a section of a packet-switched network where there are two possible routes between two nodes.

FIG. 1 shows a section of a packet-switched communications network where a connection between subscriber A (first party of a data connection) and subscriber B (second party of a data connection) has two possible routes between nodes A and B, i.e. A-B and a-b, so that A→B and a→b are one-way routes where data from subscriber A may be transmitted to subscriber B (the former route via node A2 and the latter via node A1), and B→A and b→a are one-way routes where data from subscriber B may be transmitted to subscriber A (the former route via node A2 and the latter via node A1).

In the following the rerouting method of the invention is described assuming that, initially, routes a→b and b→a are active (i.e. a bidirectional route a-b via node A1). Rerouting is made to routes A→B and B→A (i.e. a bidirectional route A-B via node A2). In this example it is further assumed that the rerouting is made at the initiative of the subscriber A end (node A). Here, reference is also made to FIG. 2, where the vertical axis shows the time and the hatched vertical bars show the transmission and reception periods of both the node A and the node B in connection with the rerouting.

Figure 2:
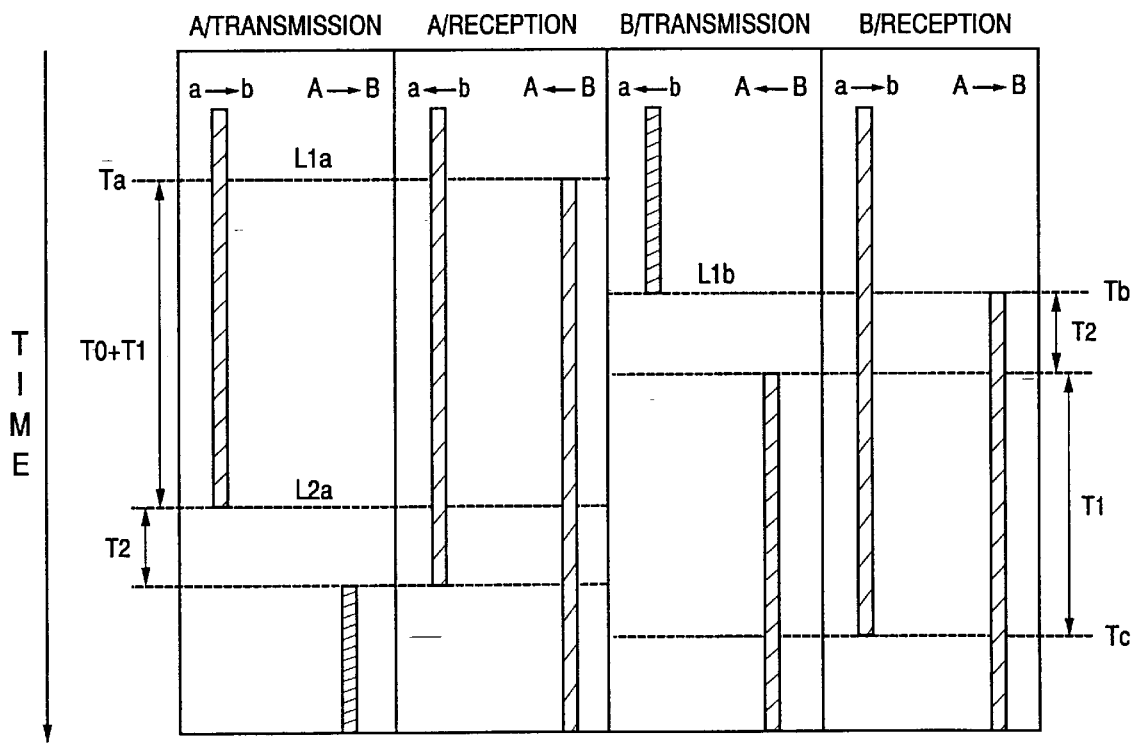
FIG. 2 is a time diagram illustrating the method of the invention as regards measures taken by nodes at the termination points of a route.

Initially both nodes use the route a-b, as illustrated by the upper parts of the vertical bars of FIG. 2. The rerouting starts by the initiating end (i.e. in this case the node A) transmitting a message to the opposite end (to the subscriber interface unit of the subscriber B at the node B, provided that the node B is a subscriber node on the periphery of the network); that message notifying of rerouting to the route A-B. Simultaneously, the node A activates the connection B→A, i.e. starts to listen to a new route. This instant is denoted by Ta. Thereafter the routes a→b and A→B are thus active, i.e. the node A will receive (potential) traffic pertaining to the connection from both routes.

Subsequently, the node A will wait (preserve status quo) for a predefined period of time T0+T1, which is a network-specific parameter where T0 denotes the total of the processing time delays of the nodes A and B, and T1 denotes the maximum delay of the route (a→b) used in the notification. The purpose of the waiting time is to ensure that the opposite end node has finished processing the notification concerning rerouting.

After the predetermined time period has elapsed, the node A will deactivate the route a→b, i.e. cease transmission to the route a-b.

Thereafter the node will still wait a predefined time T2, whereafter the node A will also deactivate the route b→a, i.e. cease to receive from the deactivated route, and activate the route A→B, i.e. start transmission to a new route A-B. The time T2, during which the node A has to buffer potential traffic originating from the subscriber A, represents the maximum value of the inter-route delay difference (the maximum delay of the route a-b minus the minimum delay of the route A-B). This buffer time will ensure that the order of the packets is not disrupted, i.e. the packets transmitted along a new route will not bypass the last packets being transmitted along the old route. Buffering is not performed if the above mentioned delay difference is less than or equal to zero, as in that case the packet order cannot be disrupted.

Thus, the node A has ceased to use the route a-b and started to use the route A-B only, both in transmission and in reception.

As to the node B, rerouting will proceed as follows (FIG. 2).

At the time Tb, the node B receives from the node A the above mentioned notification of rerouting to the route A-B; consequently, the node B will immediately activate the route A→B, whereby both route a→b and A→B will be active, and the node will listen to both routes. Simultaneously, the node B will deactivate the route b→a, i.e. will cease to transmit to the latter route.

At this point, the node B will buffer potential traffic received from the subscriber B for the duration of the delay difference T2 of the network in order to ensure, once again, that packets reach the opposite end in the right order. After the time T2, which at its maximum is only about a few milliseconds, has elapsed, the node B will activate the route B→A, i.e. begin transmitting to a new route.

Subsequently, the node B will wait until the time T1 has passed (preserving status quo), whereafter it is certain that no packets will be arriving from the deactivated route. At this point, the node B will deactivate the route a→b, i.e. it will also cease to listen to the deactivated route.

Thus, the node B has also ceased to use the route a-b and started to use the route A-B both in transmission and in reception. The traffic is thus transmitted to a new route within a certain time window (from the time Ta to the time Tc). Rerouting takes place in the above described manner so that data is not received simultaneously from different routes, and the rerouting is terminated as regards both nodes, in that the respective node will independently stop (using time-out) listening to the deactivated route.

FIG. 2 shows an example of the time relations between the transitions performed by the nodes. In principle, the time relations between the functions performed by the nodes may vary, however, within certain limits. This could be illustrated in FIG. 2 by cutting out e.g., the half representing the node B and by sliding it vertically (along the time axis). The method of the invention would still work, on the one hand when the uppermost dashed line L1b on side B rises to the same level with the uppermost dashed line L1a on side A (non-delay network), and on the other hand when the uppermost dashed line L1b on side B falls to the same level as the dashed line L2a on side A.

Various redundancies may be added to the above described procedure, e.g. the state of the routes A→B and B→A may be tested by an internode message exchange before transfer to those routes. The transfer message starting the rerouting and the subsequent waiting period, which makes sure that the opposite end has received information of the rerouting, may be changed into a request for which acknowledgement is expected from the opposite end, and the next step is taken only thereafter.

Conflict situations, where both nodes start rerouting by sending the above described notification or request, are eliminated by including a numerical identifier to the transfer notification or request, this identifier indicating the node whose notification or request will dominate. Such an identifier could be e.g., the number of the network node (each network node has a unique number indicating its authority in relation to other nodes) or a random number.

Figure 3:
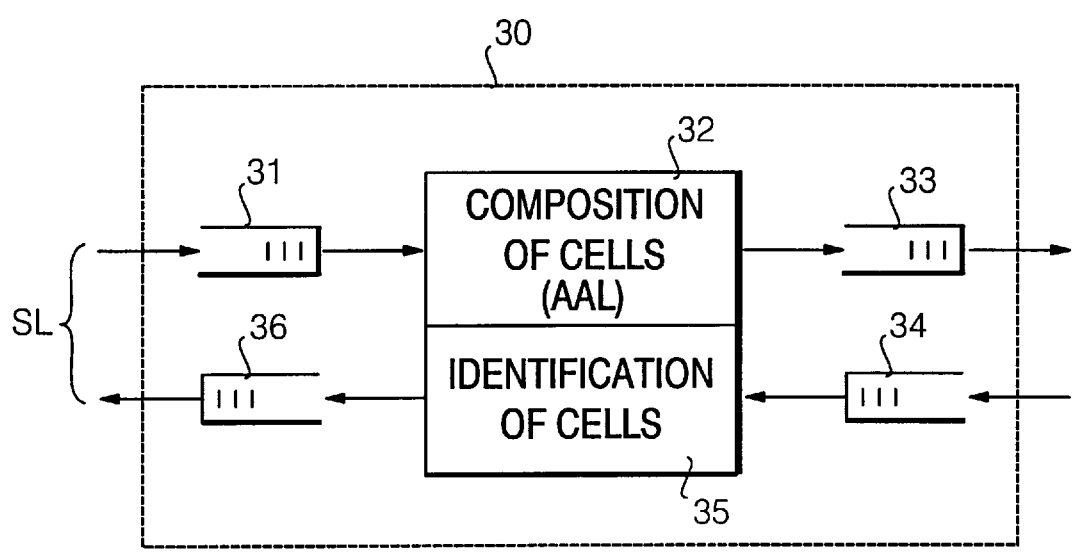
FIG. 3 shows in greater detail a subscriber interface unit at a node at a termination point of a route, the node being thus a subscriber node.

FIG. 3 shows a subscriber interface unit 30 of an ATM node A (or B) as a block diagram, this node being in this case a subscriber node. The data received by the node from subscriber A via a subscriber line SL is first buffered into an input buffer 31, and is input from there into an ATM adaptation unit 32, which performs the functions associated with the protocol to be adapted, these functions depending on the type of the subscriber link. In case e.g. HDLC type frames are received from the subscriber (which frames may originate from e.g., the local area network of the subscriber), the frames are segmented into cells and the cells are allocated headers in the adaptation unit. The finished ATM cells are buffered into an output buffer 33, and from there input further to an internode trunk line via a switching field of the node (not shown) and the line interface unit (not shown).

The adaptation unit 32, and the identifier unit 35 of the receiving direction, actually perform functions of the ATM Adaptation Layer ALL of the ATM layer model, thereby in fact functioning in a manner described in the recommendations I.362 (B-ISDN ATM Adaptation Layer (AAL) functional description) and I.363 (B-ISDN ATM Adaptation Layer (AAL) specification). The choice between AAL protocols (AAL1 . . . AAL5) depends, in a manner known per se, on the type of the subscriber connection (service class).

Thus, in practice, in the transmitting direction rerouting is realized in the adaptation unit 32 by changing the VPI/VCI identifier pair in the headers of the cells to be transmitted so that it corresponds to the link of the new route.

In the receiving direction, an input buffer 34 receives ATM cells from the switching field; those cells are input into an identifier unit 35, which forms the subscriber data, e.g. HDLC frames. The same subscriber (subscriber line SL) may receive data from several different connections, which means that several different virtual channel or virtual path identifiers (VCI, VPI) of the ATM cell headers may denote the same subscriber line SL. Finally, a check sum is calculated in the identifier unit from the formed data frame, and, if the sum is correct, the frame is provided with an address (e.g. a DLCI identifier, Data Link Connection Identifier) and input via the output buffer 36 to the subscriber line.

Thus, in the receiving direction, activating a certain connection actually means that the node will begin to transmit ATM cells with a virtual path/virtual channel identifier pair corresponding to the new link to the subscriber connection, and deactivating means that the node will cease to transmit ATM cells with a virtual path/virtual channel identifier pair corresponding to the old link to the subscriber connection.

Even though the invention has been explained in the above with reference to examples in accordance with the accompanying drawings, it is obvious that the invention is not restricted to them but can be modified within the scope of the inventive idea disclosed in the above recited and in the attached claims. As becomes evident from the above, the method of the invention has no special requirements for the internal structure of the node; the characteristics of the invention may be implemented as control measures in a type of ATM node known per se.

List of references

[1]. Recommendation I.610: B-ISDN operation and maintenance principles and functions, CCITT Study Group XVIII Geneva, 9–19 June 1992.

[2]. Recommendation I.361: B-ISDN ATM Layer Specification, CCITT; ANSI T1.617 Annex D.

I claim:

1. A method for rerouting a packet-mode data connection, wherein traffic to be transferred between two nodes of the network is rerouted from a first, deactivated route to another, new route, comprising the steps of:

the node of one end of the connection initiating rerouting from said deactivated route by sending a notification of the rerouting to the node of the opposite end of the connection and simultaneously starting to receive traffic from both of said routes;

the opposite end node, having received said notification of the rerouting, starting to receive traffic from both of said routes, both of said nodes switching transmission of data to said new route, so that each end receives data from only one route at a time, and terminating rerouting for both of said nodes such that both of said nodes independently cease to listen to said deactivated route.

2. The method as claimed in claim 1, wherein:

the in said switching, said opposite end node switching transmission to said new route before said initiating node, said switching by said opposite end node being effected in response to receiving of said notification concerning said rerouting; and transmission of data to said new route being initiated only after a buffering period having a predefined duration.

3. The method as claimed in claim 1 or 2, further comprising:

said node initiating said rerouting performing time supervision after said sealing of said notification of said rerouting; and after the expiration of a time-out period said node initiating said rerouting ceasing transmission to said deactivated route.

4. The method as claimed in claim 1 or 2, further comprising:

said node initiating said rerouting, after transmission of the notification of rerouting, waiting for an acknowledgment of reception of said notification from said opposite end node, whereafter said node initiating said rerouting ceasing transmission to said deactivated.

5. The method as claimed in claim 3, wherein:

said node initiating said rerouting initiates transmission to said new route only after elapsing of a buffering period of a predefined duration beginning from when said node initiating said rerouting has stopped transmission to said deactivated route.

6. The method as claimed in claim 1, wherein:

said packet mode data is transmitted in ATM cells.

* * * * *